United States Patent [19]

Coste

[11] 4,373,149

[45] Feb. 8, 1983

[54] PULSE-CONTROLLED ELECTRIC WINDOW RAISER

[75] Inventor: Jean-Claude Coste, Marly-le-Roi, France

[73] Assignee: Regie National des Usines Renault, Boulogne-Billancourt, France

[21] Appl. No.: 185,555

[22] Filed: Sep. 9, 1980

[30] Foreign Application Priority Data

Sep. 13, 1979 [FR] France ............................... 79 22863

[51] Int. Cl.³ ........................... H02P 1/18; H02P 3/08

[52] U.S. Cl. ................................ 318/281; 307/10 R; 318/256; 318/264; 318/445

[58] Field of Search ............... 318/280, 281, 283, 287, 318/255, 256, 264, 445; 307/10 R

[56] References Cited

U.S. PATENT DOCUMENTS

| | | | |
|---|---|---|---|
| 3,124,732 | 3/1964 | Dupy | 318/283 |
| 3,243,680 | 3/1966 | Burns | 318/287 |
| 3,551,770 | 12/1970 | Isaacs | 318/283 X |
| 4,035,702 | 7/1977 | Pettersen et al. | 318/283 X |
| 4,079,298 | 3/1978 | Prager | 318/280 X |
| 4,203,039 | 5/1980 | Pritchard | 307/10 R |
| 4,278,922 | 7/1981 | Grebe | 318/264 |

FOREIGN PATENT DOCUMENTS

| | | | |
|---|---|---|---|
| 2646634 | 4/1978 | Fed. Rep. of Germany | 307/10 R |
| 2820330 | 11/1979 | Fed. Rep. of Germany | 318/283 |
| 590700 | 1/1978 | U.S.S.R. | 318/280 |

*Primary Examiner*—J. V. Truhe
*Assistant Examiner*—Richard M. Moose
*Attorney, Agent, or Firm*—Oblon, Fisher, Spivak, McClelland & Maier

[57] ABSTRACT

An electric pulse-controlled unit for a window raiser designed especially for use on an automobile, including a motor to raise and lower the window, a power circuit to activate this motor, a motor control capable of being moved from a cutoff position into first and second active positions in which the motor is activated respectively to raise and lower the window, and a mechanical control switch enabling selection of one of the active positions in order to operate the motor in the desired direction. Between each active position of the mechanical control switch and the power circuit for controlling the motor for raising and lowering the window, there is provided two circuits in parallel, each having a control flip-flop with a respective reset input connected in parallel by means of an OR logic circuit to a set of circuits comprising in particular: a delay circuit, a double control detection circuit, and a voltage loading detection circuit.

5 Claims, 11 Drawing Figures

PULSE-CONTROLLED ELECTRIC WINDOW RAISER

BACKGROUND OF THE INVENTION

1. Field of the Invention

This invention relates to a pulse-controlled electric window raiser, usable in particular, though not exclusively, on an automobile.

2. Description of the Prior Art

A window raiser designed for use in a road vehicle is already known, and is notable in that it comprises a motor for raising and lowering the window, two power supply terminals designed to be connected to a direct current power supply source, a reversing switch capable of being moved from a cutoff position towards first and second active positions, in which the motor is activated so as to raise and lower the window respectively, a control circuit which, when excited, prevents the raising of the window, and a means of exciting the control circuit when the window is touched, provided that the reversing switch is in its first active position.

The control circuit, when excited, can either stop the motor or reverse its connections, and therefore its direction, in order to lower the window.

The movement of the window is interrupted in case of detection of excess current corresponding, for example, to the end of the cycle or an obstacele. This feature, while interesting for safety, can cause premature blocking of the windows due to manufacture tolerances, notably in the tracks. In addition, electric window raisers as they are presently installed on automobiles have the practical drawback requiring that the mechanical control switch be manually held down during the entire time that the window is being raised or lowered.

SUMMARY OF THE INVENTION

Accordingly, one object to this invention is to provide a novel, window raiser control unit, designed notably for use on an automobile which is free of the above-noted drawbacks and which is of the type comprising a motor to raise and lower the window, a power circuit to activate the motor, a motor control circuit capable of being moved from the cutoff position to first or second active positions in which the motor is activated to raise or lower the window respectively, a mechanical control switch enabling selection of one of the active positions in order to operate the motor in the direction desired.

According to the invention, between each position of the mechanical control switch and the motor power part is connected a flip-flop of the type having priority reset and set-to-one inputs, with the reset inputs of the different flip-flops connected in parallel by means of a first logic circuit adapted to a set of circuits including notably: a first delay circuit, a double control detection circuit, and a voltage loading circuit.

According to one characteristic, the preselection inputs of the various flip-flops are connected in parallel by means of a second logic circuit adapted to a set of circuits including notably: a central control validation switch and a circuit for moving the vehicle doors into the lock and unlock positions.

According to another characteristic, movement of the doors into the "lock" position has the effect of connecting the power supply to the voltage loading circuit by means of a second delay circuit, causing the initiation of the first delay circuit of the pulse controlled system, and causing the windows to close by acting upon the set-to-one input of the flip-flops controlling the raising of the windows.

According to yet another characteristics, movement of the doors into the "unlock" position, provided that it is preceded by a "lock" position command so as to supply power to the system, causes the vehicle windows to open by acting upon the set-to-one input of the flip-flops controlling the lowering of the windows.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DESCRIPTION OF THE PREFERRED EMBODIMENTS

Figure 1:
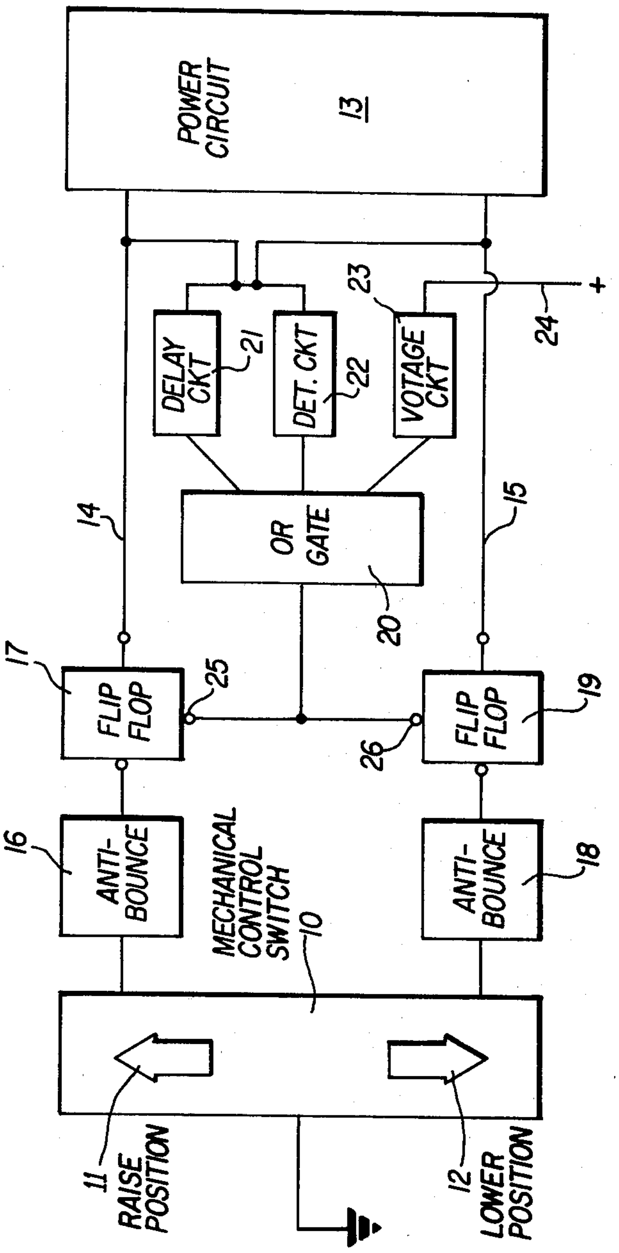
FIG. 1 is a block diagram of one possible embodiment of a pulse-controlled electric window raiser control system according to the present invention.

Referring now to the drawings, wherein like reference numerals designate identical or corresponding parts throughout the several views, and more particularly to FIG. 1 thereof, there is seen a mechanical control switch, 10, having two active positions, represented symbolically by arrows 11 and 12. These two active positions 11 and 12 are connected by two parallel circuits 14 and 15 to the appropriate elements of a power switch circuit 13 for controlling the window raiser motor which is not shown. The first circuit 14 comprises the series connection of an antibounce circuit 16 and two-count flip-flop 17 of the type having priority reset and set-to-one inputs as well as a preselection input. The second circuit 15 comprises, in an analogous fashion, the series connection of contacts 12 of mechanical switch 10, an antibounce circuit 18 and a two-count flip-flop 19 of the same type as flip-flop 17. Reset inputs 25 and 26 of respective flip-flops 17 and 19 are connected in parallel to the output of a first logic circuit 20 which is, for example, an OR function having three inputs which are connected respectively to the outputs of a delay circuit 21, a double control detection circuit 22 and a voltage circuit 23 for the loading entire unit under the invention. Voltage loading circuit 23 is connected by its input conductor 24 to an electronic circuit whose construction will be spelled out in the description of FIG. 2 below. The inputs of delay circuit 21 and double control detection circuits 22 are respectively connected to each other and to flip-flops 17 and 19. The active positions 11 and 12 of mechanical control switch 10 are of the brief contact type; i.e., the driver of the vehicle need only press switch 10 into active position 11 very briefly for an impulse to be released which sets the corresponding input of flip-flop 17 to one, which orders the raising of the window until it is completely closed. In similar fashion, the momentary pressure by the driver on switch 10 into active position 12 releases an impulse which sets the corresponding input of flip-flop 19 to one, which orders the lowering of the window until it is completely open. Partial opening of the window is obtained by momentarily pressing the command switch 10 again into any active position once the window is in the desired position.

The safety is not a direct effect at the window level as in some competitive embodiments; rather, it requires the intervention of the user. In pulse control, a second pulse, wherever it comes from, following the control pulse, stops the movement of the window due, on the one hand, to flip-flops 17 and 19 set up as a counter-by-two and, on the other hand, to the association of OR function 20 with delay circuit 21 and double control circuit 22, and to the fact that circuit 36 (FIG. 2) is connected by its output to reset inputs 25 and 26 of flip-flops 17 and 19.

Each action of the user on control switch 11 or 12 causes a change in the state of the associated flip-flop 17 or 19. Resetting of flip-flops 17 and 19 results from the appearance of signal coming either from voltage loading circuit 23, or from circuit 21 corresponding to the end of a delay which assures stoppage at the end of the window's course, or from logic circuit 22 which detects the command from the window raiser motor in both directions.

Figure 2A:
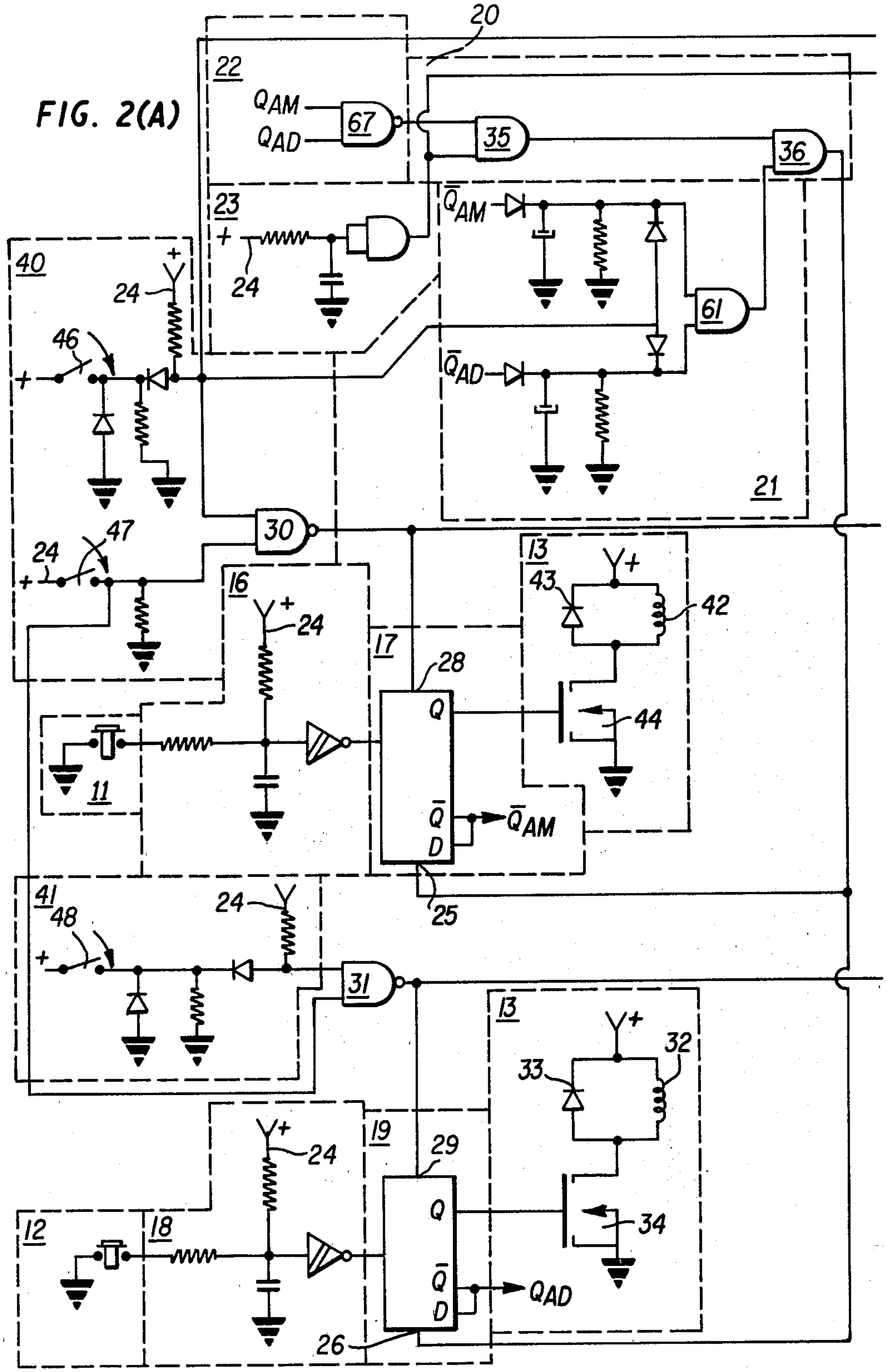
FIG. 2 is a detailed circuit diagram of the FIG. 1 embodiment illustrating electronic circuits for controlling the raising and lowering of the two front and rear windows situated on the same side of an automobile by means of a corresponding central control.
Figure 2B:
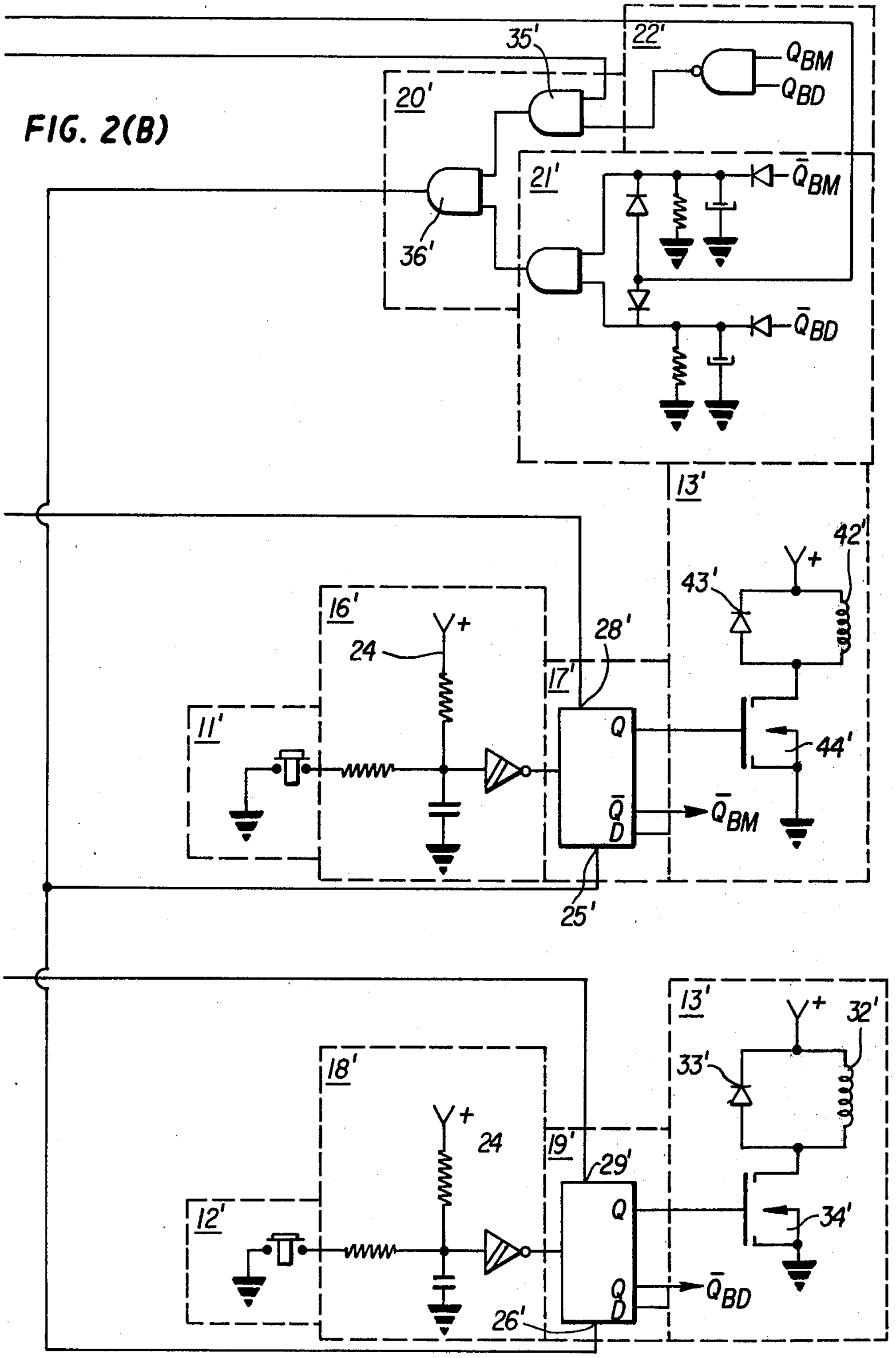

FIG. 2 illustrates in a more detailed manner electronic circuits for controlling the raising and lowering of two front and rear windows on the same side of a vehicle with a corresponding central control, with the circuits of FIG. 2 corresponding to the blocks shown and FIG. 1, with circuit details additionally being represented in FIGS. 3–9. The same numerical references have been chosen as in FIG. 1 to designate the circuit elements associated with the window raiser motor of the front door of the vehicle, while the same numerical references followed by the "prime" sign have been used to designate the elements of the circuits connected with the window raiser motor of the rear door of the vehicle located on the same side.

Figure 3:
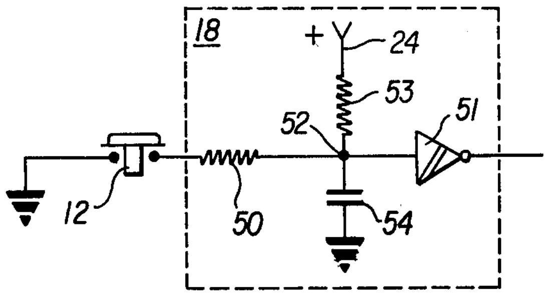
FIGS. 3 to 9 are circuit diagrams illustrating details of the components illustrated in FIG. 2.

In FIG. 2, moving from the left of the figure, one can recognize successively brief contacts 11 and 12 of control switch 10, each followed by an antibounce circuit, 16 and 18 respectively, the details of which are shown in FIG. 3. Each antibounce circuit is connected by its output to the set-to-one input of a flip-flop designated respectively by 17 and 19, and also designated hereinafter by AM for 17 and AD for 19, the letter M for "montee" (raise) and the letter D for "descente" (lower), with letter A designating the flip-flops assigned to control the movements of the window raiser motor of the front door, while the corresponding flip-flops for controlling the movements of the rear door window raiser motor are designated by 17' or BM and 19' or BD, respectively. Reset inputs 25 and 26 of flip-flops 17 and 19 can be seen connected in parallel at the output of AND logic gate 36. Flip-flops 17 and 19 each also have preselection input, 28 and 29, respectively, each connected to the output of a NAND logic gate 30 and 31, transmitting instructions coming from the central window control. Non-reversing output Q of flip-flop 17 is connected to the motor control power circuit 13, which comprises, for example, a V-MOS transistor 44, represented symbolically and connected through its source-drain region between ground and power supply plus through a parallel connection of winding 42 of a relay and a protection diode 43 intended to avoid over-voltages which could cause deterioration of the V-MOS transistor 44. If we assume that relay winding 42 is the one controlling the motor in the direction for closing the front window, then in the same manner a second winding 32, controlling the motor in the direction for opening the front window, is connected to non-reversing output Q of flip-flop 19 by a circuit which is identical in all respects to the preceding one.

Figure 4:
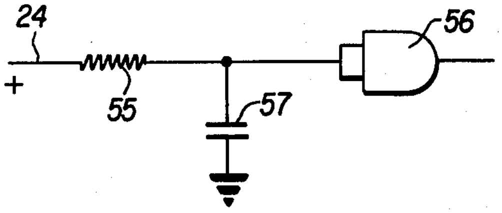
Figure 5:
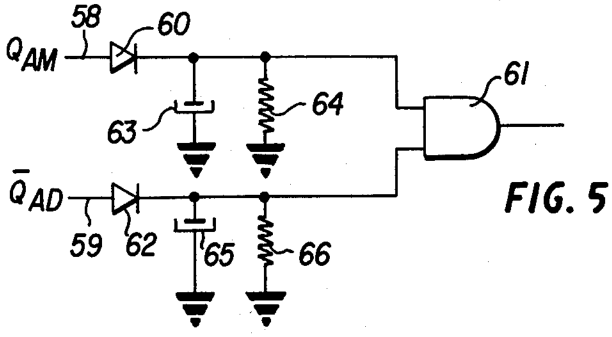
Figure 6:
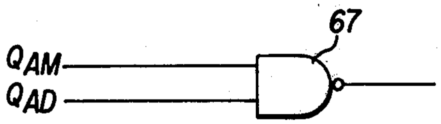
Figure 7:
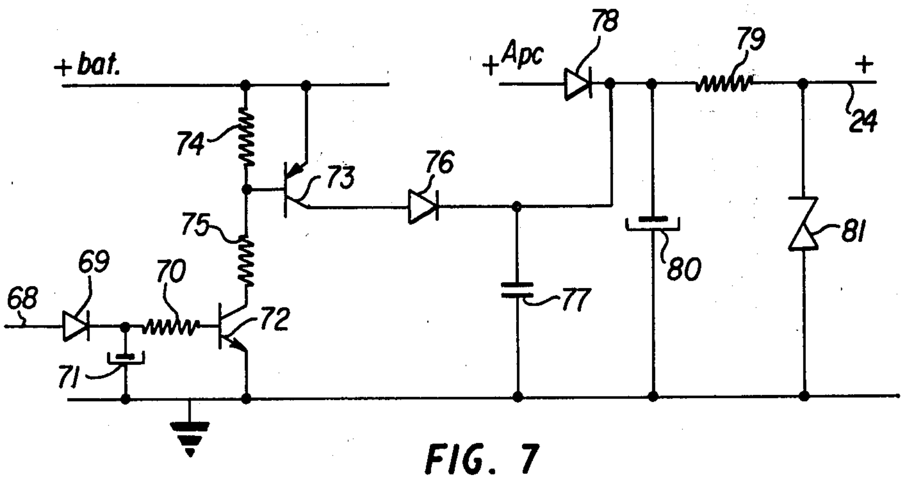

OR function 20, which is the combination of AND gates 35 and 36, is connected by its inputs to delay circuit 21 represented in FIG. 5, to logic circuit 22 for detecting motor commands in both directions represented in FIG. 6, and to the voltage loading detection circuit 23 represented in FIG. 4, whose input 24 is connected to the output of an electronic circuit illustrated in FIG. 7 and which is part of the unit's power supply. Logic circuit 22 detecting motor commands in both directions and voltage loading detection circuit 23 are connected to logic gate 36 by means of an AND function logic gate 35. Logic circuit 22 controlling the motor in both directions includes a NAND logic gate 67 connected by its inputs to the non-reversing outputs of flip-flops 17 and 19, while delay circuit 21 also represented in FIG. 5 is connected by its inputs to the reversing outputs of flip-flops 17 and 19.

Figure 8:
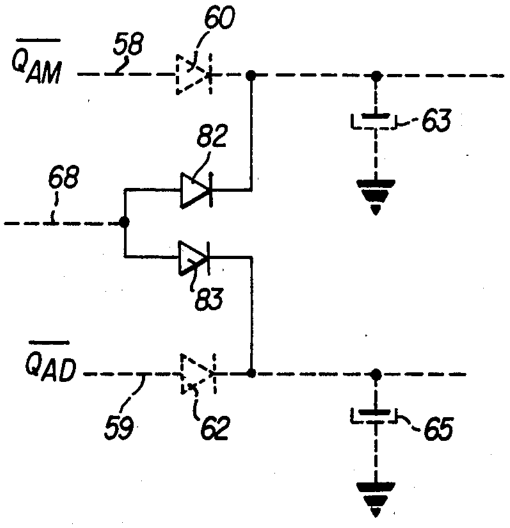
Figure 9:
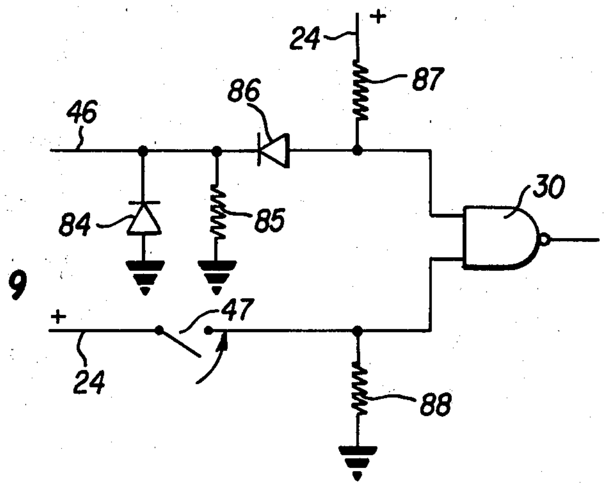
Figure 10:
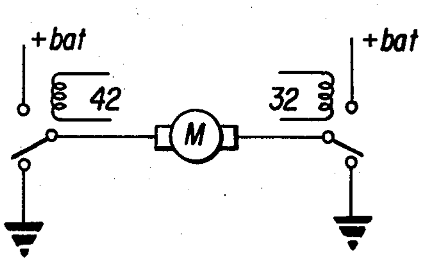
FIG. 10 is a schematic circuit diagram illustrating the motor control circuit according to the invention.

In addition, and in accordance with the present invention, control of the windows is centralized, i.e. locking the doors causes the automatic closing of the windows. This function can be carried out either by introducing the key into the lock and rotating it towards the lock position, or by acting upon the centralized lock command, in which case the locking of the doors is associated with the automatic closing of the windows. This latter function can be inhibited depending on the position of a switch if one wishes to lock the doors while leaving the windows partially or completely open. The centralized control acts, on the one hand, on the flip-flops 17 and 19 used for pulse control by means of their preselection input 28 and 29, and on the other hand on the unit's power supply, since this function is generally used when the power supply contact of the vehicle is cut off. Movement of the doors into "lock" position produces the following effects:

supply of the electronic systems over conductor 24 in FIGS. 1 and 2 by means of an auxiliary electronic circuit illustrated in FIG. 7. Conductor 24 appears in several places in FIG. 2;

initiation of delay circuit 21 of the pulse controlled system by means of a connection illustrated in FIG. 8, located inside circuit 21 in FIG. 2;

closing of the windows by action upon the preselection of raising flip-flops 17 and 17' by means of a circuit 40 illustrated in FIG. 9, ending in NAND logic gate 30 encountered previously. On the upper branch of circuit 40 a switch 46 corresponding to the lock position has been represented, while on the lower branch of circuit 40 another switch 47 corresponding to the validation position has been represented.

To the right of the stationary terminal of validation switch 47, a conductor 49 joins one of the inputs of NAND function logic gate 31 noted above, which is connected by its second input to a circuit 41 incorporating inter alia a switch 48 representing the "unlock" position. Movement of the doors into the "unlock" position causes, by means of the logic gate 31, the windows to open by acting on the preselection of lowering flip-flops 19 and 19' by their preselection input 29 and 29′. Switch 47 provides validation of the centralized control.

It should be pointed out that movement into the unlock position does not occur unless it is preceded by movement into the lock position; otherwise, the unit is not supplied with power.

Nextly is provided a brief description of FIGS. 3–9 pertaining to the embodiment of the window raiser of the invention which is illustrated in FIG. 2.

FIG. 3 illustrates, for example, brief contact 12 of window raiser mechanical control switch 10 followed by antibounce circuit 18 comprising the series connection of a resistance 50 and a tripping inverter 51. Point 52, common to resistance 50 and tripping inverter 51, is connected on the one hand to ground by means of a capacitor 54, and on the other hand to conductor 24, connected to the electronic circuit illustrated in FIG. 7 through a resistance 53. FIG. 4 illustrates an embodiment of voltage loading detection circuit 23, which is connected at its input to conductor 24 connected to the electronic circuit illustrated in FIG. 7, and which comprises the series connection of a resistance 55 and an AND function logic gate 56, whose two inputs are joined together. The common point of the two preceding components is connected to ground by means of a capacitor 57. FIG. 5 illustrates an embodiment of a delay circuit 21, according to which circuit inputs 58 and 59 are connected respectively to reversing outputs $\bar{Q}_{AM}$ and $\bar{Q}_{AD}$ of the raising 17 and lowering 19 flip-flops controlling the window raiser motors. Input conductor 58, connected to reversing output $\bar{Q}_{AM}$, is connected to an AND function logic gate 61 through a series diode 60, a capacitor 63 and a parallel resistance 64, with the last two connected to ground by one of their ends. Input conductor 59, connected to reversing output $\bar{Q}_{AD}$, is connected to the second input of logic gate 61 by means of a series diode 62, a capacitor 65 and a parallel resistance 66, with the last two connected to ground by one of their ends.

FIG. 6 illustrates an embodiment of bidirectional motor control detection logic circuit 22 of FIG. 1, composed of a NAND logic gate 67 connected by its two inputs to the non-reversing outputs $\bar{Q}_{AM}$ and $\bar{Q}_{AD}$ of raising 17 and lowering 19 flip-flops which control the movements of the windows by means of the drive motors.

FIG. 7 illustrates an embodiment of the electronic circuit assuring the power supply to the group of circuits of FIG. 2 and being centrally controlled through a second delay circuit joined to conductors 24 of FIG. 2. The circuit illustrated in FIG. 7 includes an input conductor 68 containing a switch which 46 has not been shown and which is closed in the lock position. The input conductor 68 is connected to the base of a transistor 72 through series connection of a diode 69 and a resistance 70, the common point of these two components being grounded by means of a capacitor 71. The collector-emitter region of transistor 72 is in series with a voltage divider formed by two resistances 74 and 75, with the series combination of these components being connected at one end to the "plus battery" of the vehicle and at the other end to ground. The common point of resistances 74 and 75 is connected to the base of a second transistor 73 of a conductivity type opposite the preceding one, whose emitter is connected to the "plus battery" and whose collector is connected through a series diode 76 to the cathode of a second diode 78 connected by its anode to the "plus after contact" of the vehicle. The cathode of diode 76 is connected to ground by means of a capacitor 77, and the cathode of diode 78 is connected to ground by means of a capacitor 80. Diode 78 is in series with a resistance 79 to conductor 24, encountered in FIGS. 1 and 2, and a Zener diode 81 is connected between ground and conductor 24.

FIG. 8 makes explicit the connection of the lock circuit, consisting of the upper half of circuit 20 illustrated in FIG. 2, over the conductors of delay circuit 21, also illustrated in FIG. 5. Conductor 68, above noted in the discussion of FIG. 7 and containing the switch which is closed in the lock position, is connected through two diodes 82 and 83 to the cathodes of diodes 60 and 62 identified in FIG. 5 over respective conductors 58 and 59 coming from reversing outputs $Q_{AM}$ and $Q_{AD}$ of raising and lowering flip-flops 17 and 19.

Finally, FIG. 9 illustrates an embodiment of circuit 40 of FIG. 2 corresponding to the central control which acts on the one hand, upon the flip-flops used for the control pulse, and on the other hand upon the unit's power supply, since this function is usually used with the contact cut off. In this figure, conductor 46, which includes the lock/unlock switch, is connected to an input of NAND logic gate 30 by means of a diode 86 connected to ground by means of the parallel connection of a diode 84 and a resistance 85, while the anode of this same diode 86 is connected to output conductor 24 of the auxiliary electronic circuit through a resistance 87. The second input of logic gate 30 is also connected to output conductor 24 of the auxiliary electronic circuit by means of validation switch 47. A resistance 88 has one end connected to this second input of gate 30 and is grounded at its second end.

In the device according to the present invention, the safety is therefore not activated by action at the window level but requires the intervention of the user.

In pulse control, a second pulse following the control pulse stops the movement of the window regardless of which contact of the mechanical switch has been pressed by the user.

In centralized control, the act of moving into the unlock position after having gone into the lock position causes the vehicle's windows to lower.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electric pulse-controlled unit for controlling movement of an automotive window provided for use in a vehicle having at least one lockable door with at least one window, comprising:

a motor for raising and lowering said at least one window;

power circuit means for activating said motor; including motor control means for providing one of a cut-off position and first and second active positions with said motor being activated for respectively raising and lowering said window when one of said first and second active positions is provided;

a mechanical control switch enabling selection of one of the first and second active positions in order to operate the motor in a selected direction;

raising and lowering flip-flops having priority reset, preselection input and set-to-one inputs and being connected between the output of said mechanical control switch and the input of said power circuit means;

a control pulse resetting system coupled to the priority reset input of said flip-flops, comprising, a first delay circuit controlled by the reverse outputs of said flip-flops;

a double control detection circuit controlled by the non-reverse outputs of said flip-flops;

a voltage loading detection circuit, and an OR-gate having inputs coupled to outputs of said delay circuit, said double control detection circuit and said voltage loading detection circuit, as well as an output coupled to the priority reset inputs of said flip-flops;

wherein said mechanical control switch produces a pulse output upon a first selection of one of said first and second active positions to initiate respective raising or lowering of said window.

2. An electric window control unit according to claim 1, further comprising:

the preselection inputs of each flip-flop parallel connected through a logic gating circuit to a set of control circuits for controlling window raising and lowering, said set of control circuits including, central control validation switch, and door locking circuit means for moving the vehicle's doors into lock or unlock positions.

3. An electric window control unit according to claim 2, further comprising:

a voltage loading circuit, a second delay circuit;

a power supply, wherein a movement of the door into a lock position by said door locking circuit means connects the power supply to the voltage loading circuit by means of the second delay circuit, causes initiation of the first delay circuit of the control pulse resetting system and causes the at least one vehicle window to close by action upon the set-to-one input of the raising flip-flop.

4. An electric window control unit according to claim 3, further comprising:

means for causing the at least one vehicle window to open by action on the preselection input of the lowering flip-flop upon movement of the door into the unlock position by said door locking circuit means.

5. An electric window control unit according to claim 1, further comprising:

means for stopping a window movement when a second selection is performed on the mechanical control switch before the end of the period of said first delay circuit.

* * * * *